(12) United States Patent
Lenk et al.

(10) Patent No.: US 12,480,800 B2
(45) Date of Patent: Nov. 25, 2025

(54) RADAR MEASURING DEVICE, MEASURING ASSEMBLY AND LENS

(71) Applicant: VEGA GRIESHABER KG, Wolfach (DE)

(72) Inventors: Fritz Lenk, Schiltach (DE); Florian Olschewski, Zell am Harmersbach (DE)

(73) Assignee: VEGA Grieshaber KG, Wolfach (DE)

( * ) Notice: Subject to any disclaimer, the term of this patent is extended or adjusted under 35 U.S.C. 154(b) by 287 days.

(21) Appl. No.: 17/955,116

(22) Filed: Sep. 28, 2022

(65) Prior Publication Data

US 2023/0126902 A1    Apr. 27, 2023

(30) Foreign Application Priority Data

Oct. 21, 2021   (EP) .................................... 21203925

(51) Int. Cl.
*G01F 23/284* (2006.01)
*G01S 13/08* (2006.01)

(52) U.S. Cl.
CPC .......... *G01F 23/2845* (2013.01); *G01S 13/08* (2013.01)

(58) Field of Classification Search
CPC .............................. G01S 13/08; G01F 23/2845
See application file for complete search history.

(56) References Cited

U.S. PATENT DOCUMENTS

| 10,725,160 B2 | 7/2020 | Larsson |
| 10,969,265 B2 | 4/2021 | Fredriksson |

| 2006/0239632 A1* | 10/2006 | Bogdan | H04N 23/57 |
| | | | 257/E31.127 |
| 2007/0008212 A1* | 1/2007 | Serban | H01Q 1/225 |
| | | | 342/124 |
| 2008/0204351 A1 | 8/2008 | Gerding | |
| 2009/0212996 A1* | 8/2009 | Chen | H01Q 13/02 |
| | | | 342/124 |
| 2013/0099989 A1* | 4/2013 | Pantea | H01Q 13/0208 |
| | | | 343/783 |
| 2015/0241261 A1* | 8/2015 | Cheng | G01F 23/284 |
| | | | 342/124 |
| 2018/0113020 A1 | 4/2018 | Fredriksson | |
| 2019/0128728 A1 | 5/2019 | Fredriksson | |
| 2019/0353514 A1* | 11/2019 | Kienzle | G01S 13/88 |
| 2020/0003603 A1 | 1/2020 | Uddh | |

(Continued)

FOREIGN PATENT DOCUMENTS

| CN | 210664669 | 6/2020 |
| DE | 102018101798 A1 * | 8/2019 |
| EP | 3168580 | 5/2017 |

OTHER PUBLICATIONS

EPO Extended European Search Report for application EP 21203925 issued on Mar. 24, 2022.

*Primary Examiner* — William Kelleher
*Assistant Examiner* — Hailey R Le
(74) *Attorney, Agent, or Firm* — William Gray Mitchell (57) ABSTRACT

The present invention relates to a radar level measuring device with a housing, wherein the housing can be connected in a sealing manner to an accommodating portion, wherein the housing is configured at the front as a process connection and wherein a dielectric lens is disposed at the front of the housing and connected to the process connection such that the lens is fixed in the axial direction relative to the housing, by a positive connection being formed between the lens and the process connection.

15 Claims, 5 Drawing Sheets

(56) References Cited

U.S. PATENT DOCUMENTS

| | | | |
|---|---|---|---|
| 2020/0087135 A1* | 3/2020 | Youn | B01D 29/15 |
| 2020/0264030 A1* | 8/2020 | Mueller | G01S 7/032 |
| 2022/0065683 A1* | 3/2022 | Wildey | G01S 7/032 |
| 2022/0158324 A1* | 5/2022 | Oh | G01S 13/88 |
| 2023/0085220 A1* | 3/2023 | Schmits | H01Q 19/062 |
| | | | 342/124 |

* cited by examiner

RADAR MEASURING DEVICE, MEASURING ASSEMBLY AND LENS

CROSS REFERENCE TO RELATED APPLICATIONS

This patent application claims priority to European Patent Application 21203925.9, filed on Oct. 21, 2021.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a radar measuring device, in particular a radar level measuring device, a measuring assembly comprised of a radar level measuring device in an accommodating portion, and a lens for such a radar measuring device.

Background of the Invention

Radar measuring devices are generally known for the purpose of measuring a filling level or limit level of a filling medium in a process environment, e.g. a tube, a container or the like. Such radar measuring devices have antenna systems that emit into the process environment via lenses, or that couple radar waves onto a bar or a cable probe (guided wave).

Radar measuring devices, e.g. radar level measuring devices which, in accordance with the time-of-flight principle, detect a filling level of a filling material located in a container, particularly of liquids and bulk material, are known from the prior art. Radar level measuring devices of this type are equipped with horn antennas and/or lenses, for example, via which an HF signal that has been coupled in is emitted in the direction of the filling material and reflected by the latter. The signals reflected by the filling material are captured and evaluated in a combined transmitter/receiver system of the radar level measuring device.

Horn antennas basically have a simple and rugged structure, a very high degree of efficiency, and are inexpensive to manufacture.

For the purpose of beam forming, it is known that such horn antennas may have at a front end, in the main emission direction of an antenna horn, a dielectric lens. The electromagnetic waves propagating in the antenna horn in a substantially spherical segment-shaped manner are transformed in this manner into wave fronts that are as parallel as possible and propagate in the main emission direction, and a directivity of the antenna is thus obtained.

Beam forming may also already take place when a transmitted signal is generated and/or a transmitted signal is received, if a plurality of transmitters and/or receivers generally arranged in the form of an array is used as a transmitting and/or receiving element. This is then referred to as digital beam forming.

In particular, FMCW radar measuring devices (FMCW: Frequency Modulated Continuous Wave) may be used, which are thus also capable of sensing a topology of the surface or a position of an object. One application example is the filling level measurement in closed or open containers, and particularly also the determination of the bulk material quantity. The FMCW radar measuring devices may have an array antenna device with a plurality of antenna elements, e.g. in the form of planar radiator elements. The array antenna device is configured for emitting the FMCW transmitted signal in the direction of the object and for receiving a corresponding, reflected received signal. They may be combined transmitting and receiving antennas, or separate transmitting and receiving antennas. The FMCW transmitted signal is a frequency-modulated continuous wave signal in which the transmission frequency is altered within a frequency band during a measurement, typically in the shape of a continuous or stepped ramp.

With such a FMCW radar measuring device, it is possible to perform so-called digital beam forming in order to scan a region in space with the transmitted signal, so that a surface topology in the scanned region in space can be calculated from the reflected received signal.

It may be noted at this point that reference is made below, for the sake of convenience, to radar measuring devices or radar level measuring devices. However, the features described with respect to radar measuring devices and radar level measuring device are equally applicable to radar-based filling level measuring devices, limit level measuring devices, interface measuring devices and topology-detecting radar level measuring devices.

In order to accommodate such a radar measuring device, the process environment, i.e. such a container, for example, has an accommodating portion which may be configured as a clamp connector or threaded tube connector. Accommodating portions in the form of adapters, which adapt a process connection of the radar level measuring device to an accommodating portion that is available or usable at the process environment, are also known from the prior art.

Figure 1:
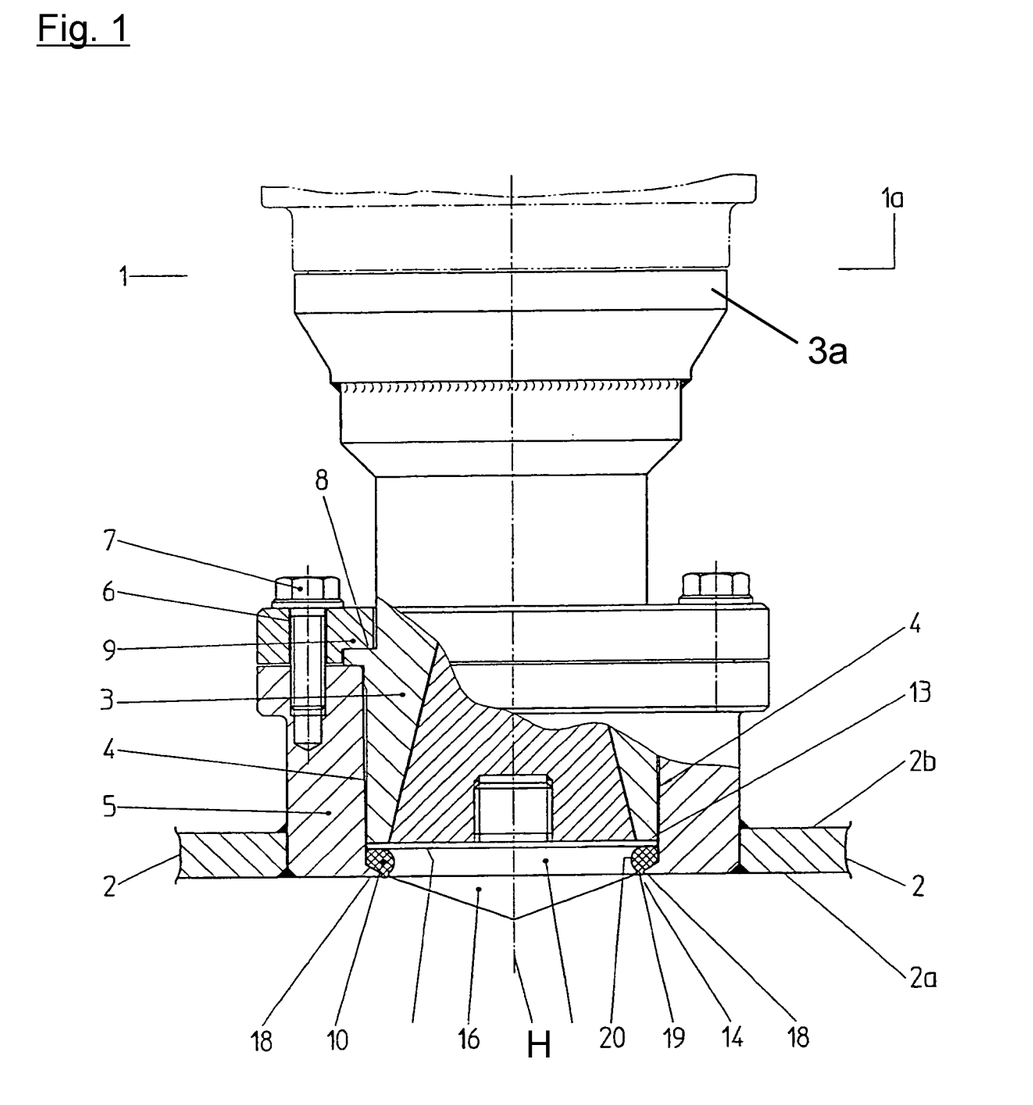
FIG. 1 is a line drawing evidencing a measuring assembly consisting of a radar measuring device 1 and an accommodating portion 5 in accordance with the prior art (already discussed)

A measuring assembly comprised of a radar level measuring device 1 and an accommodating portion 5 in accordance with the prior art is shown in FIG. 1.

According to the present exemplary embodiment, as is apparent from the sectional view in FIG. 1, the radar measuring device 1 is configured as a radar level measuring device 1 and the accommodating portion 5 as a flange 5 at an opening in a container wall of a container 2.

In a rearward area in the main emission direction H, the radar level measuring device 1 has radar electronics 1a which, among other things, effect a signal generation of transmitted signals for emission into the container 2 and a signal processing of radar signals reflected on and received from a filling material in the container 2, for example. Starting from the radar electronics 1a, a process connection 3 extends in the direction of the container interior of the container 2, wherein the process connection 3 is in the present case integrally configured with a horn antenna for emitting and receiving the radar waves. The front portion of the horn antenna is closed off with a dielectric lens 16. The process connection 3 with a lens 16 disposed thereon protrudes into a through-hole 4 formed in the wall of the container 2.

In order to permit a stable arrangement of the radar level measuring device 1 in the through-hole 4, a flange 5 is formed in or arranged on the container wall of the container 2. The flange 5 protrudes from the container 2, preferably towards the outside, in order thus to form the through-hole 4 with a larger guide and contact surface.

Moreover, the flange 5 serves for attaching the radar level measuring device 1 to the container 2. In the illustrated embodiment, the flange 5 has in the region of its outer circumference a threaded bore 6 into which a clamping screw 7 can be screwed in order clamp the radar level measuring device 1. At an outer circumference of the process connection 3, the radar level measuring device 1 has a dog 8, over which a clamp 9 extends, wherein the clamp 9 is attached to the flange 5 using the clamping screw 7. Depending on the thickness of a seal 10 and/or the length of the measuring device connection relative to the position of the dog 8 at the circumferential wall, the dog 8 may simultaneously serve as a stop for a desired end position, as is depicted by way of example by the dog 8 abutting against the flange 5.

In the illustrated embodiment, the flange 5 is welded into the wall of the container 2. This makes a particularly smooth surface possible in the area of the inner face of the container 2a, because a smoothing and polishing process can be carried out after the flange 5 has been welded to the wall of the container 2. However, other forms of attachment in the accommodating portion 5 are also possible, e.g. by means of a union nut engaging a male thread on the flange 5, a screw-in thread, by means of which the radar measuring device 1 can be screwed into a female thread of the flange 5, or various adapting means, depending on the requirements of the process.

In the transitional region or adjoining region to the container inner face 2a of the container 2, the inner face of the through-hole 4 and the outer face of the radar level measuring device 1 have a special formation for the accommodation 5 of one or several sealing members. This serves for enabling a particularly stable retention of the radar level measuring device 1 in the through-hole 4, at the same time making possible a smooth surface of the inner face 2a of the container also in the transitional region towards the end face of the radar level measuring device 1. In particular, a seal 10 in the form of a substantially commonly available O-Ring can be used.

The inner wall of the through-hole 4 is configured such that it extends towards the inner face 2a of the container in the direction parallel to the main emission direction H of the radar level measuring device 1 through the through-hole 4. That is, while forming an opening wall 18 protruding into the through-hole 4, the through-hole 4 narrows towards the inner face 2a of the container. In other words, the flange, leading into the through-hole 4, becomes wider 5 towards the inner face 2a of the container, e.g. in the shape of a small awning.

The inclination or steepness of the wall 18 protruding into the through-hole 4 towards the inner face 2a of the container is in this case dimensioned such that an abutment is formed for a seal 10 clamped between this wall 18 and a dog 13 of the radar level measuring device 1. Moreover, the inclination is chosen such that the seal 10 pressed against this wall 18 is pressed in the direction of a gap-shaped separating region 14, which is formed between the inner wall of the through-hole 4 in the area adjacent to the inner face 2a of the container and the outer circumference there of the radar level measuring device 1, in this case the lens 16.

In order to avoid a laborious machining of the container 3 or the container wall and/or the flange 5 in this region, various adapters have taken hold in the prior art, which, on the one hand, have the above-described configuration of the through-hole 4 and can be connected to the container 2 via a standardized connecting mechanism. As examples, mention may be made of the so-called clamp connection (DIN32676, ISO 2852), the screwed pipe coupling DIN 11851, the screwed pipe coupling DIN 11864-1, the hygienic connection F40 with compression nut, the hygienic connection with clamping flange, the DRD connection, the SMS screwed connection, the Neumo Biocontrol connection or the Varivent adapters, as well as others.

In its front portion, in the present case in the area of an outer circumference of the lens 16 in the transitional region towards the inner face 2a of the container, the radar level measuring device 1 has a circumference which is configured to be narrower than a diameter of the through-hole 4 there, such that a separating region 14 is formed.

At a distance from the inner face 2a of the container, the radar level measuring device 1 has a dog 13 for the seal 10. In the present case, the dog 13 is configured as an integral part of the lens 16. The dog 13, the circumferential wall of the lens 16 located in front thereof, and the inner wall of the through-hole 4 and of the wall portion, which protrudes thereinto, of the opening wall 18 protruding into the through-hole 4 form a space for the accommodation 5 of the seal 10.

When inserting the radar level measuring device 1 into the through-hole 4, the seal 10 located in this region is clamped and pushed or pressed by the dog 13 in the direction of the inner face 2a of the container and of the opening wall 18 protruding into the through-hole 4. In particular also due to the inclination of the opening wall 18 of the flange 5 protruding into the through-hole 4 or of the container wall of the container 2, the seal 10 is pressed into the separating region 14 between the opening wall 18 protruding into the through-hole 4 and the outer circumference of the radar level measuring device 1, in the present case, the lens 16. In this case, the seal 10 is not only pressed into the separating region 14, but up to the inner face 2a of the container, or preferably so as to bulge slightly into the interior of the container 2. In this case, the opening wall 18 protruding into the through-hole 4 projects obliquely in the direction towards the separating region 14, so that the protruding opening wall 18 serves as an abutment and, at the same time, a guiding member for the pressed-on seal 10.

In the present exemplary embodiment, the lens 16 is centrally connected with a filling 54 of the horn antenna 50 via a threaded bolt molded onto the lens 16.

It is the object of the invention to specify a radar measuring device, in particular a radar level measuring device, which has an improved handling. Moreover, a measuring assembly formed from such a radar measuring device and an accommodating portion, as well as a lens for such a radar measuring device are to be specified.

BRIEF SUMMARY OF THE INVENTION

In a preferred embodiment, a radar measuring device (1), in particular a radar level measuring device, with a housing, wherein the housing (3a) can be connected in a sealing manner to an accommodating portion (5), wherein the housing (3a) is configured at the front as a process connection (3) and wherein a dielectric lens (16) is disposed at the front of the housing (3a) and connected to the process connection (3) such that the lens (16) is fixed in the axial direction relative to the housing (3a), characterized in that a positive connection (20) is formed between the lens (16) and the process connection (3).

In another preferred embodiment, the radar measuring device (1) as described herein, characterized in that the positive connection (20) is configured as a latching connection.

In another preferred embodiment, the radar measuring device (1) as described herein, characterized in that the positive connection (20) is configured as a snap-fit connection.

In another preferred embodiment, the radar measuring device as described herein, characterized in that the snap-fit connection is configured as an annular snap-fit connection.

In another preferred embodiment, the radar measuring device (1) as described herein, characterized in that the annular snap-fit connection has, on the one hand, a preferably peripherally extending web (24) with latching members and, on the other hand, a preferably peripherally extending contact portion (24) as an abutment.

The radar measuring device (1) as described herein, characterized in that the web (24) is formed on the lens side and the contact portion (24) is formed on the process connection side (3).

In another preferred embodiment, the radar measuring device (1) as described herein, characterized in that the ring and/or the contact portion (24) are formed in a segmented manner in the circumferential direction.

In another preferred embodiment, the radar measuring device (1) as described herein, characterized in that a lens-side part of the positive connection is formed from the same material as the lens (16).

In another preferred embodiment, the radar measuring device (1) as described herein, characterized in that the lens (16) is formed from at least two parts, a lens body (15) and a connecting part (17), wherein the connecting part (17) is formed as a lens-side part of the positive connection from a different material than the lens body (15).

In another preferred embodiment, the radar measuring device (1) as described herein, characterized in that the lens body (15) and the connecting part (17) are connected to each other by means of two-component injection molding.

In another preferred embodiment, the radar measuring device (1) as described herein, characterized in that an insert (31) is disposed in the process connection (3).

In another preferred embodiment, the radar measuring device (1) as described herein, characterized in that the insert (31) is configured as a dog for biasing the lens (16) in relation to the process connection (3).

In another preferred embodiment, the radar measuring device (1) as described herein, characterized in that the insert (31) is integrally formed with an antenna, preferably a horn antenna (50).

In another preferred embodiment, the radar measuring device (1) as described herein, characterized in that the insert (31) is arranged such that it blocks a disengagement of the positive connection.

In another preferred embodiment, the radar measuring device (1) as described herein, characterized in that the insert (31) has a stop (33), preferably a peripherally extending stop (33), for limiting an insertion depth of the stop (33) into the process connection (3).

In another preferred embodiment, the radar measuring device (1) as described herein, characterized in that the positive connection (20) is formed by a snap ring (26) disposed between the process connection (3) and the lens (16).

In another preferred embodiment, the radar measuring device (1) as described herein, characterized in that the process connection (3) and the lens (16) have grooves that are formed so as to correspond to each other, and the snap ring (26) is dimensioned such that, in the installed state, it comes to rest between the process connection (3) and the lens (16) such that it limits an axial movement at least in the direction towards the front.

In another preferred embodiment, the radar measuring device (1) as described herein, characterized in that the lens (16) is rotatably supported relative to the process connection (3).

In another preferred embodiment, the radar measuring device (1) as described herein, characterized in that the lens (16) is non-rotatably supported relative to the process connection (3).

In another preferred embodiment, the radar measuring device (1) as described herein, characterized in that a first seal (11) is disposed between the lens (16) and the process connection (3), wherein, preferably, the lens (16) forms an accommodating space (12) for the first seal (11).

In an alternate preferred embodiment, a measuring assembly comprised of a radar measuring device (1), in particular a radar level measuring device, and an accommodating portion (5), wherein the radar measuring device (1) has a housing (3a) and can be connected in a sealing manner to the accommodating portion (5), characterized in that the radar measuring device (1) is configured as described herein.

In another preferred embodiment, the measuring assembly as described herein, characterized in that a second seal (10), which preferably meets the requirements of hygienic processes, is arranged directly between the lens (16) and the accommodating portion (5).

In another preferred embodiment, the lens (16) for a radar measuring device (1), wherein the lens has a lens body (15) and a connecting part (17), characterized in that the connecting part (17) is configured in a suitable manner for forming a positive connection between the lens (16) and the radar measuring device (1).

In another preferred embodiment, the lens (16) as described herein, characterized in that the lens body (15) and the connecting part (17) are connected to each other by means of two-component injection molding.

DETAILED DESCRIPTION OF THE INVENTION

A radar measuring device according to the invention, in particular a radar level measuring device, has a housing and is connected in a sealing manner to an accommodating portion, wherein the housing is configured at the front as a process connection and wherein a dielectric lens is disposed at the front of the housing and connected to the process connection such that the lens is fixed in the axial direction, in particular in the direction of a main emission direction of the radar measuring device, relative to the housing. According to the invention, the radar measuring device is characterized in that a positive connection is formed between the lens and the process connection.

Radar level measuring devices are based on the principle of time-of-flight measurements. In time-of-flight measurements, the signal travel times of emitted measurement signals, particularly of radar signals, are determined. The desired measuring quantity, e.g. a filling level or limit level, is then determined from these signal travel times.

The process environment is understood to be the space in which a filling medium is disposed whose filling level, limit level, interface or topology is to be determined. The process environment may be, for example, a vessel in the form of a tank, container, tube or silo, on which the radar measuring device is disposed. The container itself may have an accommodating portion for the radar measuring device, or a flange or port on which the radar measuring device is arranged by means of an adapter.

In the present application, the term adapter is understood to mean components that adapt, i.e. adjust, the process connection of the radar measuring device to an accommodating portion of the process environment. For example, the process connection may be configured as a screw-in thread, and a connection to, for example, a different screw-in thread or a clamp accommodating portion (DIN32676, ISO 2852) may be effected by means of an adapter. As other connecting options, mention is made of the screwed pipe coupling DIN 11851, the screwed pipe coupling DIN 11864-1, the hygienic connection F40 with compression nut, the hygienic connection with clamping flange, the DRD connection, the SMS screwed connection, the Neumo Biocontrol connection or the Varivent adapters.

The housing of the radar measuring device may have a single-part or multi-part configuration and generally serves for protecting the components disposed in the housing, e.g. signal processing electronics and an optional display and/or operating module. That the front part of the housing is configured as a process connection means that the front part of the radar level measuring device is configured such that it can be connected to a process environment. This process connection may be integrally configured with the housing or connected therewith. Generally, the process connection will be made from a material suitably selected for the process environment, e.g. a mechanically and chemically resistant material, e.g. a suitably alloyed stainless steel, such as 1.4404 (316L) or 2.4602 (Hastelloy C-22) or PEEK or ceramics. For a rear part of the housing, due to the lower chemical and mechanical requirements there, less expensive materials may be used, e.g. plastics or sheet metals from a lower alloyed steel.

Typically, process connection refers to the part of a field device with which the latter can be disposed in a process environment. Thus, the process connection constitutes the mechanical interface between the field device and the process environment.

The main emission direction is the direction into which the radar measuring device emits most strongly without digital beam forming, due to the directivity of an antenna used, or due to beam forming measures. In the case of radar level measuring devices, this is generally a surface normal on a plane formed by an end of the process connection facing towards the process environment.

The connection between the lens and the process connection is preferably effected circumferentially, i.e. in a region located at the circumference of the lens. In particular, this means that the positive connection is preferably arranged in a region that is not directly radiation-penetrated when emitting the radar radiation, and thus has no negative effects on the beam-forming action of the lens. In other words, a lens-side part of the positive connection is arranged substantially on the outside of the lens in the radial direction. In particular, this means that, based on an outer circumference of the dielectric lens, the connection between the dielectric lens and the process connection is effected no farther than 10% of a radius of the dielectric lens towards the inside. The radius of the dielectric lens results from the process connection and the thickness of the inserted seal, as well as from the shape of the protruding opening wall. This has an influence of the shape of the seal.

The lens is disposed at the front of the process connection; in particular, this means that the lens may be disposed with some portions within the process connection, but substantially sits at the front, i.e. at an end that faces, in the main emission direction, towards the process environment. The lens is inserted from the front into the process connection or arranged thereon. At least in some portions, the lens has a diameter that is greater than an inner diameter of the process connection at the front. In other words, a diameter of the lens is greater in at least one region than a clear width of the process connection, so that the lens contacts the front of the process connection and cannot be pushed through the latter. Such an arrangement is further advantageous in that the lens can rest on the process connection, particularly in a peripherally extending manner, and that thus, a good overpressure resistance of the lens can be obtained.

It is also achieved, by the arrangement according to the invention with a positive connection, that the lens does not become lost when the radar level measuring device is dismantled. This is advantageous particularly in the case of lenses arranged between the process connection and the accommodating portion of the process environment. Such an arrangement is also advantageous because the number of interfaces to be sealed can be reduced.

It may also be noted at this point that a lens according to the present application means not only dielectric components directing the electromagnetic radiation in the case of freely emitting radar measuring devices, but also dielectric components that serve for coupling the electromagnetic radiation onto a probe, e.g. a bar or a cable, and/or for insulating the probe, for example. These components are also dielectrically active and affect the electromagnetic radiation emitted by the radar measuring device, and are therefore also considered to be lenses in the sense of the present application.

In a further development of the radar level measuring device, the positive connection can be configured as a latching connection. A latching connection makes it possible to provide a positive connection in a simple and inexpensive manner, and can also be realized with little effort from a production-related standpoint. A latching connection can be simply configured such that it can be manufactured without tools or with simple tools; that means that no tools are required for inserting the lens and for establishing the positive connection. If a press, for example, is used for assembly, it can be ensured that the lens is pressed in centrally and without jamming.

In the present case, a latching connection is supposed to be understood to be a connection in which a first component and a second components are mechanically connected with each other in a connection direction by a latching member coming to rest, in the connection direction, behind an undercut or contact portion of one or both components. By the latching member reaching behind the undercut, a movement in the connection direction is prevented once the latching member rests against the undercut.

Latching members may be latching lugs or rings, for example, which, due to being movably supported, can be brought behind the undercut as seen in the connection direction, and there move behind the undercut due to an articulated or spring-elastic support. Preferably, the connection direction is parallel to the main emission direction H of the radar measuring device, and the undercut is a portion extending in the radial direction, e.g. a step or web.

A positive fit may also be obtained by means of an annular spring, a double thread, a right-hand thread for the snap-on lens and a left-hand thread for the antenna. In another variant, the positive fit may be obtained by means of a sliding guide, laterally inserting the lens into the process connection with a radial lock, or the like.

In a development, the positive connection is configured as a snap-fit connection. Snap-fit connections are functional elements for the disengageable and non-disengageable, simple, positive joining of components. In this case, one part is elastically deformed and then hooks into the other part in a disengageable or non-disengageable manner. Snap-fit connections may be realized by means of snap-fit hooks or annular snap-fit connections ("snap-fit cylinders"). In snap-fit connections, the elasticity of one of the materials used, most frequently of plastics or spring steel, is exploited for connecting two components.

The snap-fit connection can be configured as an annular snap-fit connection, for example, in which a continuous snap ring is used. An annular snap-fit connection can be particularly advantageous, because it can be configured to be rotationally symmetric, and the lens as a whole can be manufactured as a turned component. The snap ring, on whose end a peripheral web is disposed as a snap-in member—which looks like a snap-in hook in a longitudinal section—may in this case be turned together with the entire lens in a production machine.

This may be advantageous particularly in the case of materials of the lens that cannot—or only with great difficulty—be manufactured by means of an injection-molding process. Moreover, low production numbers may be a reason for using a turned components instead of an injection-molding process. A material typically used for hygienic applications is polyether ether ketone (PEEK). PEEK is a high-temperature resistant, chemically resistant and abrasion-resistant thermoplastic synthetic material well-suited as a material for the lens.

Thus, the annular snap-fit connection may have, on the one hand, a preferably peripherally extending web with latching members or the latching member and, on the other hand, a preferably peripherally extending contact portion as an abutment.

In this case, the web is preferably formed on the lens-side and the contact portion is formed on the process connection-side. This layout has proved to be particularly beneficial, because the flexibility of the material of the lens can be used in this manner for realizing a spring effect. Thus, the process connection with the contact portion, which acts as an abutment, may be formed from stainless steel, for instance.

The ring and/or the contact portion may be formed in a segmented manner in the circumferential direction. For example, this may be used for enhancing a flexibility of the spring member and facilitating an assembly of the components. By a segmented design of the snap ring, a compression in the circumferential direction during the insertion of the snap ring is reduced, and the insertion is facilitated.

Individual latching hooks which are distributed, preferably equally distributed, over the circumference of the lens can be made shorter and with greater material thickness, compared to a snap ring, so that they are also more rugged.

In one embodiment, a lens-side part of the positive connection is formed from the same material as the lens. This is advantageous in that the lens and the lens-side part of the positive connection can be manufactured in a single working step. For example, the lens with the lens-side part of the positive connection disposed thereon can be manufactured in a single injection-molding process as an injection-molded article, or as a turned part in a turning process. Combinations of the different processes are also possible and can be used.

In an alternative embodiment, the lens can be formed from at least two parts, a lens body and a connecting part, wherein the connecting part can then be formed as a lens-side part of the positive connection from a different material than the lens body. Such an embodiment is advantageous in that, for example, the lens is made from a dielectric plastic adapted to the hygienic requirements, e.g. PEEK, and the connecting part from a plastic that is adapted to the mechanical requirements of the attachment and, if possible, easy to process.

Thus, rugged and, at the same time, dielectrically adapted lenses can be manufactured by, for example, a combination of a PEEK lens body and a rugged plastic suitable for injection-molding.

The lens body and the connecting part may be manufactured separately and connected to each other by a suitable connecting technique. For example, a connection may be established by gluing, ultrasonic welding or laser welding. Alternatively, screw connections, a front screw connection, further snap-fit connections and press fits are possible.

However, such a two-part lens may be manufactured with particular ease by means of a two-component injection-molding process. In such a two-component injection-molding process, the lens body, for example, is prefabricated from a first material, e.g. PEEK, and inserted into an injection-molding tool as an insert. The connecting part can then be molded thereon, or the lens body can be partially overmolded, so that a substance-to-substance connection between the two parts is created.

In one embodiment, an insert, which is preferably integrally formed with an antenna, preferably a horn antenna, is disposed in the process connection. The advantages of a horn antenna were already explained in detail further above. However, the insert may also be designed with a different antenna, e.g. a planar antenna. The planar antenna may be configured with an adjustable main emission direction H, e.g. as a so-called phased array antenna. Antennas with an adjustable main emission direction H may be used, in particular, in topology-detecting radar measuring devices.

By means of the design with an insert which preferably forms or accommodates the antenna, a configuration is obtained in which the process connection may be adapted particularly well to the requirements of the process environment.

In this case, the insert may in turn consist of a material adapted to the requirements there.

In one embodiment, the insert is configured as a dog for biasing the lens in relation to the process connection. For this purpose, the insert may be screwed into the process connection, for instance. To this end, the insert itself may have a thread by means of which it is screwed into the process connection, which in this case has a corresponding thread. Alternatively, a dog with a thread may also be screwed into the process connection and thus press the insert into the process connection.

Moreover, the insert may be arranged and configured such that it blocks a disengagement of the positive connection in the state of being inserted into the process connection. Preferably, the insert is dimensioned such that a disengagement of the latching members, e.g. of the latching lugs, is prevented by mechanical blocking. It is thus ensured that the connection between the lens and the process connection in the installed state of the filed device cannot be disengaged inadvertently.

The insert may further have a stop, preferably a peripherally extending stop, for limiting an insertion depth of the stop into the process connection. Such a stop prevents the lens from being pushed out from the positive connection again by inserting the stop, and the positive connection from being destroyed by too deep an insertion of the insert.

In one embodiment, the positive connection may be formed as a snap ring disposed between the process connection and the lens. Such a snap ring may simply be supported in two grooves arranged in manner corresponding to one another. In the installed state, the snap ring overlaps both grooves in the radial direction, so that a connection that is positive in the connection direction is obtained. For insertion, the snap ring may be disposed in one of the grooves and expanded or pressed together (compressed) by suitable contact edges.

In the case of a rotationally symmetric component, the grooves required here for generation may be particularly easily produced by a turning process. In that case, the process connection and the lens have grooves that are formed so as to correspond to each other, wherein the snap ring is dimensioned such that, in the installed state, it comes to rest between the process connection and the lens such that it limits an axial movement at least in the direction towards the front.

In a preferred embodiment, which may be obtained both with a latching or snap-fit connection and a use of a snap ring as a connecting member, the lens is rotatably supported relative to the process connection. By means of a rotatable arrangement of the lens relative to the process connection, and thus to the radar measuring device, it is achieved, that when attaching the radar measuring device in the accommodating portion of the process environment, e.g. by screwing it in, a rotation of the lens relative to the radar measuring device is possible. A seal, e.g. an O-ring, arranged between the lens and the accommodating portion may thus be inserted without, or at least with reduced, shearing forces acting on the seal. Ideally, the lens is stationary relative to the accommodating portion when the radar measuring device is connected with the latter, so that no forces act in the circumferential direction on the seal disposed between the lens and the accommodating portion. Fewer loads on the seal in the circumferential direction result in an improved sealing effect.

In an alternative configuration, the lens is non-rotatably supported relative to the process connection. A non-rotatable mounting may make sense if the lens is heated by, for example, heating wires arranged in a parallel manner, which are incorporated in the lens or applied onto it. Since the metallization can impede or even suppress an emission of the electromagnetic field, it may be decisive in these cases that the electrical field oscillate in a perpendicular direction relative to the heating wires. Such a grid is transmissive only for this polarization.

In order to obtain as good a seal as possible, it is advantageous if a first seal is disposed between the lens and the process connection, wherein, preferably, the lens forms an accommodating space for the first seal. It is advantageous if a seal directly between the lens and the process connection is created by means of the first seal. By a consistent reduction of gaps and material transitions to be sealed, an improved tightness and a reduction of gaps in which contaminants may deposit can be obtained. Preferably, the lens forms a first accommodating space for the seal, which may preferably be configured as formed in the lens. Thus, the first seal is disposed radially between the lens and the process connection and prevents medium from entering an intermediate space between the process connection and the lens.

Preferably, the lens is configured such that, in the main emission direction, it sits at least partially in front of the process connection. It can thus be achieved that, towards the process environment, only a gap between the lens and the accommodating portion of the process environment has to be sealed. Advantageously, an accommodating space for the seal is formed and delimited by the lens and the accommodating portion.

A measuring assembly according to the invention comprised of a radar measuring device, in particular a radar level measuring device, and an accommodating portion, in which the radar measuring device has a housing and can be connected in a sealing manner to the accommodating portion, is characterized in that the radar measuring device is configured in accordance with the above description.

It is particularly advantageous if a second seal, which preferably meets the requirements of hygienic processes, is arranged directly between the lens and the accommodating portion. In particular, this means that the seal is free of dead space and easy to clean.

A particularly good seal of the transition between the installed radar measuring device and an adjacent inner wall of the accommodating portion, e.g. of the container or adapter, is effected by a part of the second seal being pressed into a lateral separating region located between them, which results from the fact that the lens has, in the area of a through-hole formed by the accommodating portion, a diameter that is made smaller than a diameter of the through-hole.

For the purpose of pressing it in in a deforming manner, the second seal, during the insertion of the radar measuring device, is pressed by a dog on the radar measuring device in the direction of the container interior, wherein a through-hole into which the radar measuring device is inserted narrows in the direction of the container interior, thus forming an abutment for the second seal. Due to such an arrangement and a corresponding assembly process, a part of the second seal is pressed into the intermediate space or separating region between the inner face of the through-hole and an outer circumference of the lens. This part of the seal, which is pressed into the separating region in a deformed state, causes the radar measuring device to be clamped into the through-hole in the lateral direction, i.e. in the direction of a plane substantially perpendicular to the installation direction of the radar measuring device, which is spanned by the accommodating portion in the installation zone. Moreover, the seal causes a sealing effect, which prevents parts of the filling medium from entering the separating region. A substantially smoothly extending surface from the accommodating portion via the parts of the seal pressed into the separating region to an inner surface, i.e. in the present case to the lens surface facing towards the process, of the radar measuring device, is created. In the present case, the inner surface of the radar measuring device is configured as an antenna cone of a radar level measuring device. Apart from preventing filling medium from entering gaps, crevices and the like, or even the inner region of the radar measuring device itself, a cleaning process for such an arrangement is thus also made easier. Moreover, it is to be noted that a particularly stable clamping of the radar measuring device within the through-hole of the container is made possible by this arrangement.

The radar measuring device has a dog for the second seal, which presses the latter into the separating region between the lens and the accommodating portion. In this case, the dog may be configured as an integral constituent part of the lens, which is manufactured from PTFE or PEEK, for example, as the actual end face of the process connection, as the end face of the insert, or as a separating or transition member towards the lens. The dog, the circumferential wall of the lens located in front thereof, and an inner wall of the through-hole of the accommodating portion and of a wall portion, which protrudes thereinto, of the opening wall protruding into the through-hole form a space for the accommodation of the second seal.

Arranging the seal directly between the lens and the accommodating portion, i.e. particularly the container or adapter, without interposed components, enables a reduction of the gaps to be sealed, a particularly tight configuration and thus the use in hygienic applications, that is, in particular, applications characterized by designing devices and installations in a cleaning-friendly manner in order to prevent contamination of foodstuffs.

Ideally, the process connection has a depth stop for limiting the insertion depth of the radar level measuring device into the accommodating portion. Due to this depth stop, a predetermined insertion depth of the radar measuring device into the accommodating portion can be precisely complied with, and a desired compression of the second seal can thus be predetermined.

In one configuration, the process connection, with a front side facing towards the process, acts as a dog on the lens, which in turn acts as a dog for the second seal. For this purpose, the lens has a peripherally extending web, which on its rear serves as a contact surface for the process connection and on its front presses the second seal into the separating region.

A lens for a radar measuring device according to the invention, in particular a radar level measuring device, has a lens body and a connecting part, wherein the connecting part is configured in a suitable manner for forming a positive connection between the lens and the radar measuring device.

The features of the lens related to its connection with the process connection of the radar measuring device, which were already cited above, also apply to the lens on its own. In particular, a lens-side part of the positive connection may be configured as a part of a latching connection, in particular a snap-fit connection. In particular, the lens body and the connecting part may be formed integrally and/or from the same material. Alternatively, the connecting part may be formed from a different material than the lens body. In particular, the lens body may be formed from a dielectrically adapted, preferably temperature-resistant, and further preferably, from a chemically and/or mechanically resistant material.

DETAILED DESCRIPTION OF THE FIGURES

FIG. 1 shows prior art as indicated.

Figure 2A:
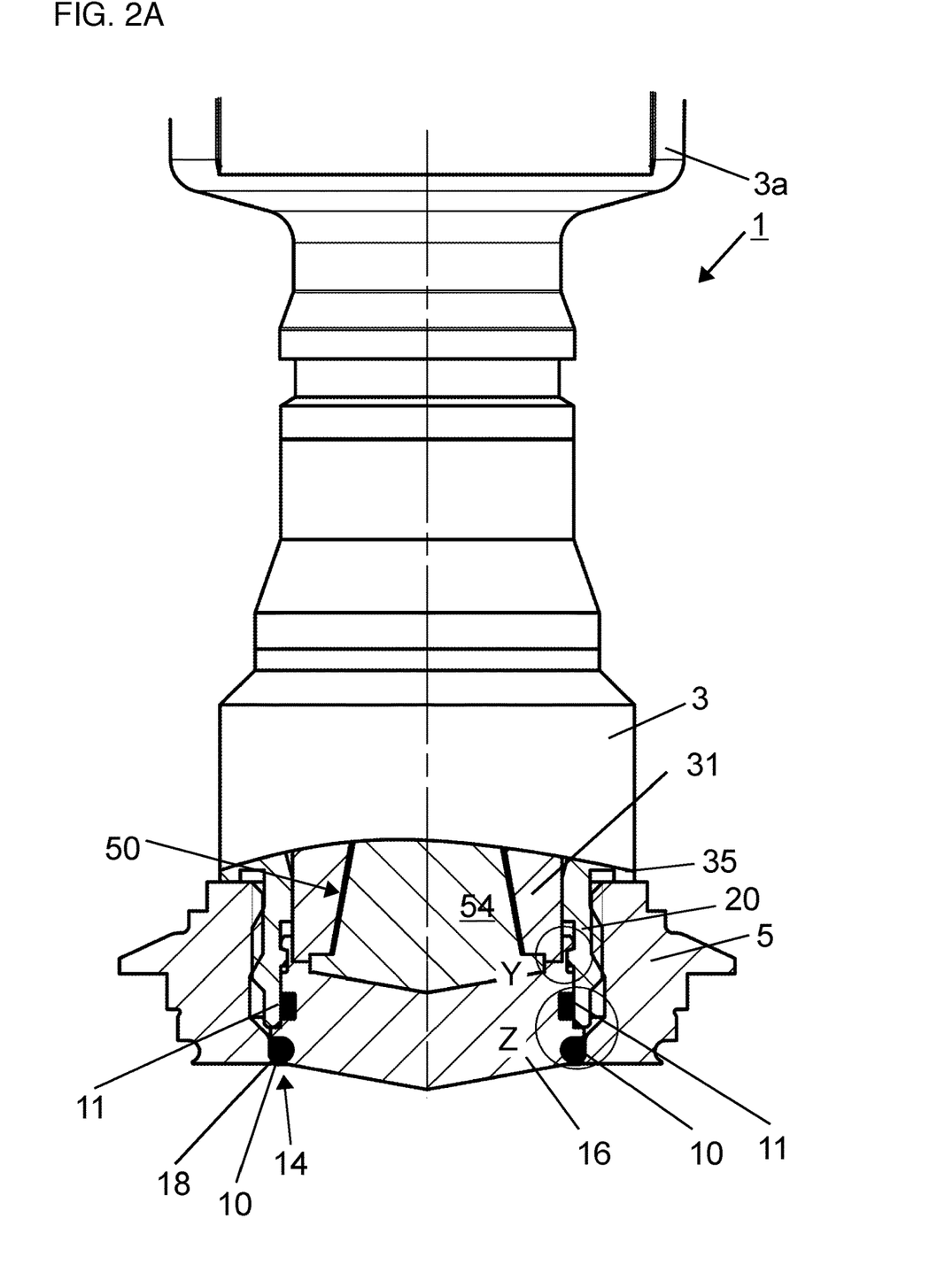
FIG. 2A is a line drawing evidencing a first exemplary embodiment of a measuring assembly with a radar measuring device 1 and an accommodating portion 5.

FIG. 2A shows a first exemplary embodiment of a measuring assembly with a radar measuring device 1 and an accommodating portion 5, which is configured as a clamping adapter in the present case. In the present exemplary embodiment, the radar measuring device 1 is configured as a radar level measuring device 1 and extends from a rear housing 3a via a process connection 3, which is configured with a screw-in thread, to a lens 16 disposed at the front, i.e. towards a process environment I. The lens 16 is seated in the accommodating portion 5 and is biased towards the process environment I by the process connection 3. The lens 16 is peripherally connected to the positive connection 3 by means of a positive connection 20, wherein the detailed design of the positive connection 20 is shown in the enlargement Y of a portion shown in FIG. 2b.

The lens 16 is made from a dielectric material, which is particularly suitable for hygienic applications. A material suitable for this purpose is polyether ether ketone (PEEK) which, as a partially crystalline thermoplastic synthetic material, has very good mechanical and also thermal properties. The lens 16 is formed with such a diameter that a peripherally extending annular gap exists between an outer circumference of the lens 16 and an inner wall of the accommodating portion 5, in the present case the adapter, so that a separating region 14 is formed between the accommodating portion 5 and the lens 16. A second seal 10, which is disposed between the lens 16 and the accommodating portion 5, and which in the present case is configured as a commercially available O-Ring, is pressed into the separating region 14 by a dog 13 molded onto the lens 16. In the present exemplary embodiment, a front end face of the process connection 3, which biases the lens 16 towards the process environment in this manner, acts on the dog 13. In the present exemplary embodiment, the process connection 3 is screwed into the adapter 5 via a screw-in thread, wherein a screw-in depth is limited by a depth stop 35 resting against the rear of the adapter 5. The lens 16 is prevented by this depth stop 35 from being pushed out from the adapter 5 in the direction towards the front. Thus, the position of the lens 16 relative to the accommodating portion 5 can be fixed in advance.

A peripherally extending first seal 11 disposed in a groove 12 of the lens 16 is arranged in an area between the lens 16 and the process connection 3, in which the lens 16 is arranged within the process connection 3. This first seal prevents 11 medium from entering the interior of the radar measuring device 1 and clamps the lens 16 in the process connection 3. In order to prevent the lens 16 from falling out of the positive connection 3 during assembly and dismantling, it is retained in the process connection 3 via the positive connection 20, which is configured as an annular snap-fit connection in the present exemplary embodiment. A disengagement of the annular snap-fit connection is prevented by an insert 31, which is disposed in the process connection 3. The insert is 31 configured and arranged in such a manner that it prevents a disengagement of the annular snap-fit connection by suppressing a spring-back of the latching members. In the present exemplary embodiment, the insert 31 is formed integrally with an antenna horn 52 of a horn antenna 50 for emitting the radar radiation of the radar measuring device 1. The horn antenna 50 is filled with a filling 54 consisting of a dielectric material.

Figure 2B:
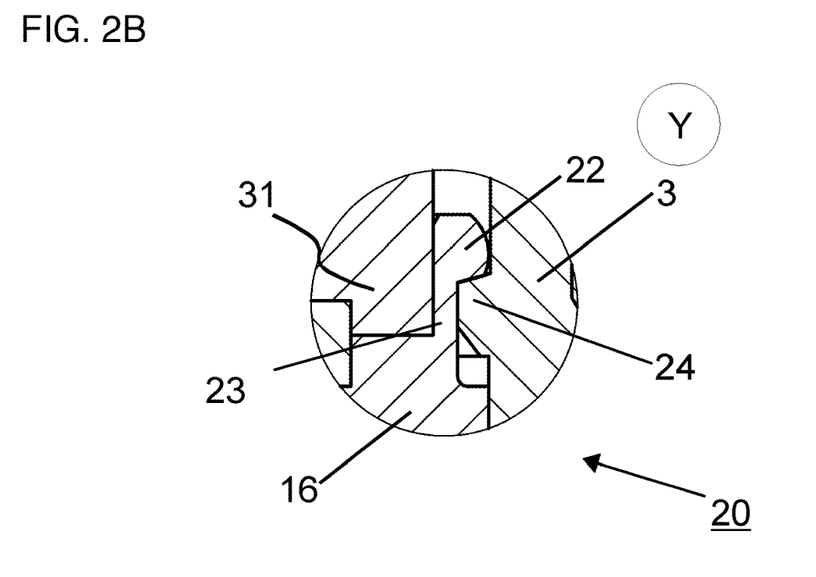
FIG. 2B is a line drawing evidencing an enlargement of a first section from FIG. 2a, FIG. 2C is a line drawing evidencing an enlargement of a second section from FIG. 2a, FIG. 3A is a line drawing evidencing a second exemplary embodiment of a measuring assembly with a radar measuring device 1 and an accommodating portion 5.

FIG. 2B shows an enlargement of a portion of the positive connection 20 from FIG. 2A. In the section shown, it can be seen that a latching member 22 for a resilient web 23 is molded on in a circumferential region of the lens 16. The resilient web extends in an axially rearward direction and enables the lens 16 to be pushed into the process connection 3 of the radar level measuring device 1 from the front. Corresponding contact edges on the latching member 22 on the one hand, and a web 24 of the process connection 3 configured as a contact portion 24 on the other hand enable the latching member 22 to come to rest behind the web 24, thus suppressing a movement of the lens 16 in the axial direction towards the front. In order to prevent a disengagement of the latching connection between the lens 16 and the process connection 3, the insert 31 is dimensioned such that, in the installed state, it comes to rest directly behind the resilient web 23 of the latching connection and thus prevents the resilient web 23 from springing back and the latching member 22 from moving over the web 24. At the same time, the lens 16 is biased in the direction towards the front by the insert 31, so that a movement in the rearward direction is also already prevented in this state.

Figure 2C:
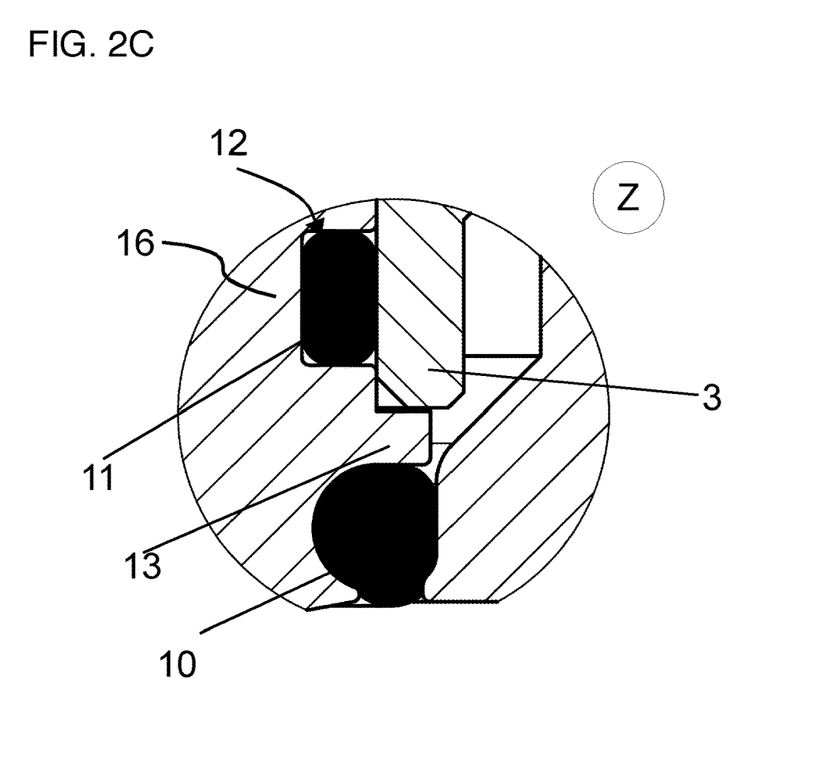

FIG. 2C shows an enlargement of a portion of the detail Z from FIG. 2A.

In this enlargement of a portion, it is particularly clear that the lens 16 has a radially extending peripheral web 24, which acts as a dog 13 for the second seal 10. In the direction towards the rear, the dog 13 is in direct contact with an end face of the process connection 3, which biases the lens 16 in the installed state in the direction towards the process environment I. The second seal 10 is pressed by the dog 13 in a beam forming manner into the separating region 14 between the accommodating portion 5 and the lens 16 and protrudes slightly from this separating region 14 in the direction towards the process environment. Due to the direct sealing between the lens 16 and the accommodating portion 5, a biasing of the lens 16 in the accommodating portion 5 is obtained and thus a particularly rugged and tight arrangement is ensured. The first seal 11 between the lens 16 and the process connection 3 is seated in a peripherally extending groove 12, which forms an accommodating space 12 for the first seal 11. Due to the positive connection 20 between the lens 16 and the process connection 3, a movement of the lens 16 in the axial direction is prevented, but a rotation of the lens 16 about a longitudinal axis A of the radar measuring device is still allowed. It is thus accomplished that, when the radar measuring device 1 is inserted into the accommodating portion 5, the lens 16 together with the second seal 10 is stationary relative to the accommodating portion 5 or at least rotates to a lesser extent than would be the case for a non-rotatable connection between the lens 16 and the process connection 3. In this way, shear strain between the second seal 10 in the circumferential direction is reduced and an improved seal between the lens 16 and the accommodating portion 5 is obtained.

Figure 3A:
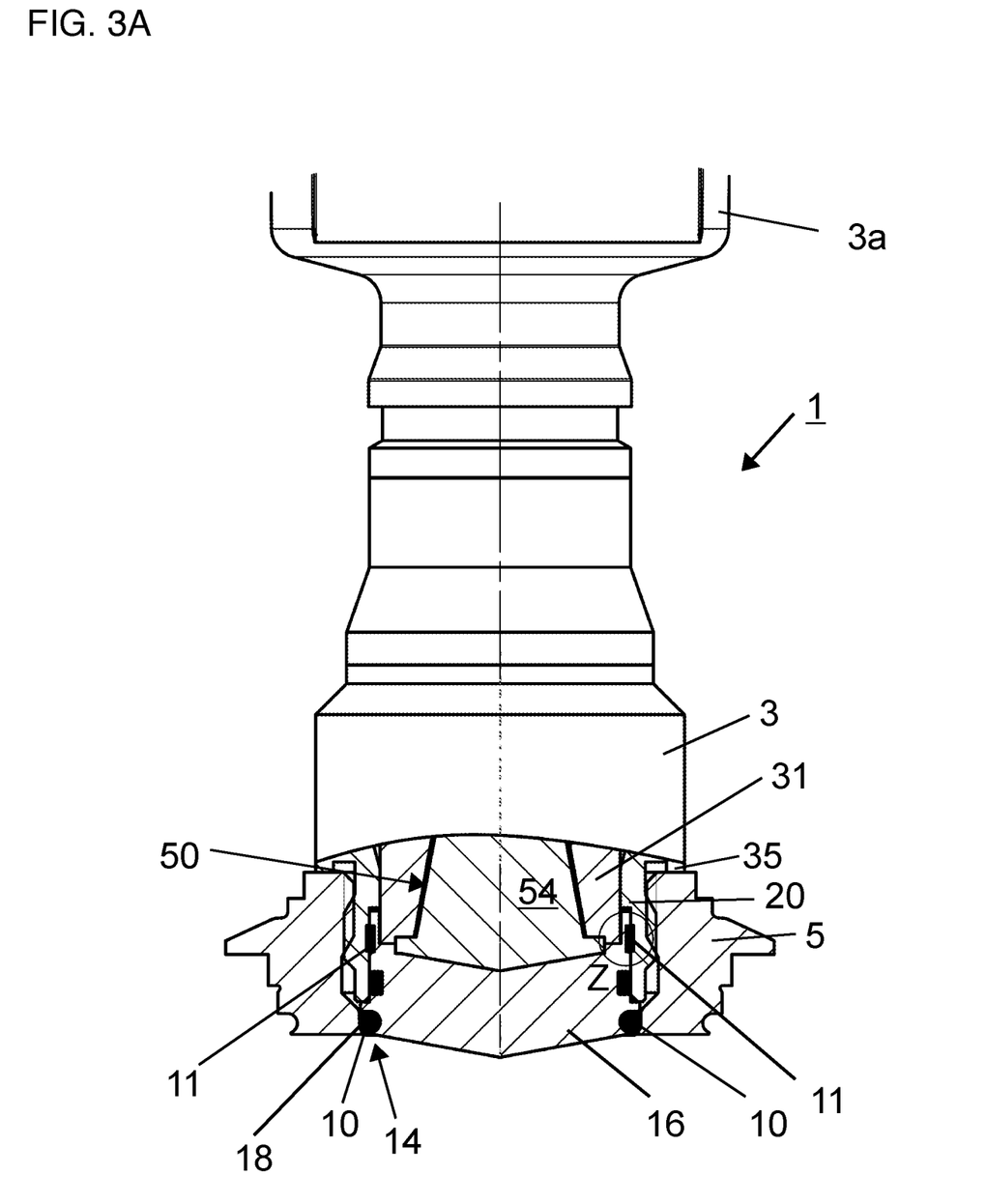

FIG. 3A shows a second exemplary embodiment of a measuring assembly in a radar measuring device 1 and an accommodating portion 5, wherein the positive connection 20 between the lens 16 and the process connection 3 is effected by a snap ring 26 disposed in correspondingly formed grooves 20 of the lens 16 and the process connection 3. In this regard, the further configuration of the exemplary embodiment shown in FIG. 3A does not differ from the configuration of the measuring assembly according to FIG. 2A, so that reference is made in this regard to the explanations there.

Figure 3B:
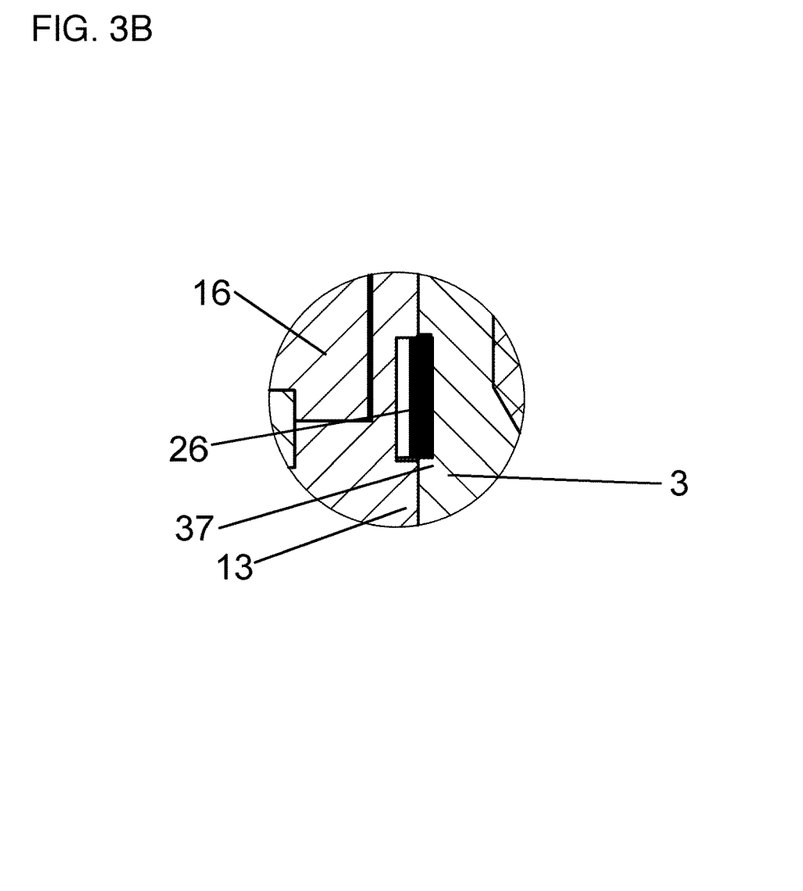
FIG. 3B is a line drawing evidencing an enlargement of a section from FIG. 3a, and FIG. 4 is a line drawing evidencing an alternative configuration of the lens 16.

An enlargement of a portion of the positive connection 20 between the lens 16 and the process connection 3 is shown in FIG. 3B, which depicts an enlargement of a portion of the detail Z from FIG. 3A.

It is clear in the enlargement of a portion of FIG. 3B that the snap ring 26 is disposed in a groove 12 of the lens 16, wherein the portion at the end face of the process connection 3 has a contact edge in such a way that the snap ring 26 is compressed when the lens 16 is inserted into the process connection 3, is pushed completely into the groove 12 of the lens 16, and then, after it has slipped over a latching lug 37 formed at the front end of the process connection 3, expands further. In addition to the latching lug 37 in the manner already described, the lens 16 forms for the second seal 10 a dog 13 formed by a peripherally extending web, so that the seal is pressed in the direction towards the front into the separating region 14 between the accommodating portion 5 and the lens 16 by means of the dog 13.

Figure 4:
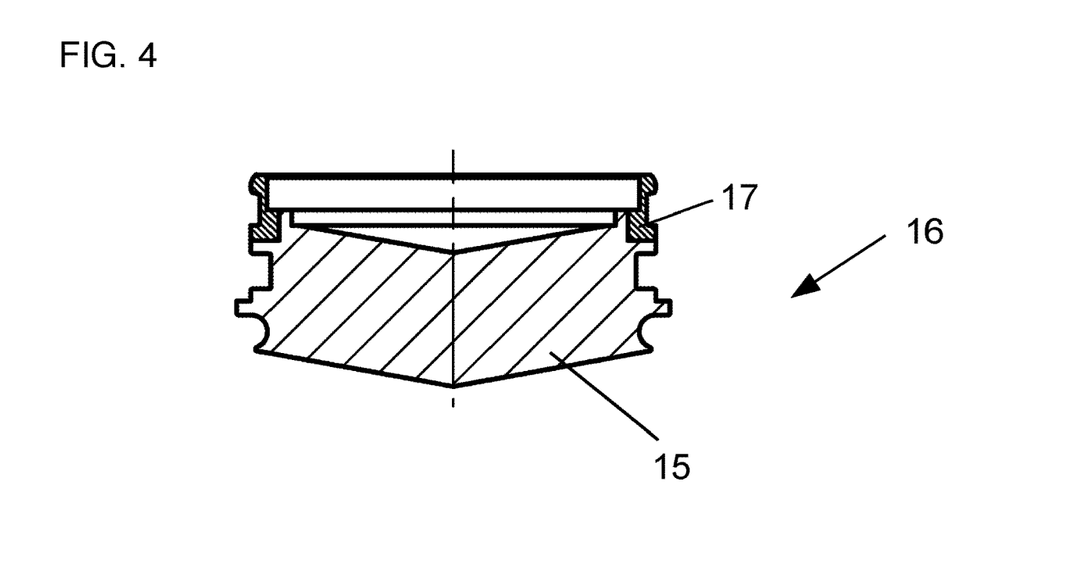

FIG. 4 shows an alternative embodiment of the lens 16, wherein the embodiment shown in FIG. 4 is formed of a lens body 15 with a molded-on dog 13 and an accommodating space 12 for the second seal 10, and a connecting part 17 is molded to the rear of a lens body 15, whereby the positive connection 20 between the lens 16 and the process connection 3 is made possible. The connecting part 17 can be molded onto the lens body 15 in a two-component injection-molding process, for instance. In this way, it is made possible that the lens 16 is made in a non-injection-molding process against material and connected with the connection part 17. In this way, it is also possible to connect a comparatively brittle material, which is not suitable for forming a spring tongue for the positive connection 20, with a suitable elastic material, so that the advantages of different materials can be combined in this manner.

The essential point in the present measuring assembly is that a plastic lens is snapped into the process connection 3 from the outside. An O-ring is inserted into an accommodating space 12, which is delimited on the inside and the rear by the lens 16, and then directly seals against the accommodating portion 5 and forms a seal allowed for hygienic applications. This process connection 3 may have different configurations, so that different connections are made possible with it.

The lens 16 is retained in the process connection 3 of the radar measuring device 1 by a positive connection 20, in particular snap-in hooks or a snap ring, even when dismantling the radar measuring device 1. Thus, the lens 16 is preferably rotatably retained in the process connection 3 and therefore does not rotate along when it is screwed into the accommodating portion 5. Thus, a seal between the lens 16 and the accommodating portion 5, e.g. an O-ring, is not excessively deformed/damaged during assembly, and the sealing function is not affected.

The attachment of the lens 16 by means of a positive fit is preferably effected by means of a snap-in hook, which is advantageously configured in a rotationally symmetric manner for ease of production as a turned part, and results in no other attachment materials being required for the lens 16.

LIST OF REFERENCE NUMBERS

1 Radar measuring device, radar level measuring device
2 Container
3 Process connection
4 Through-hole
5 Accommodating portion, flange, adapter
6 Threaded bore 7 Clamping screw
8 Dog
9 Clamp
10 Second seal
11 First seal
12 Accommodating space, groove
13 Dog
14 Separating region
15 Lens body
16 Lens
17 Connecting part
18 Opening wall
20 Positive connection
22 Latching member
23 Resilient web
24 Contact portion, web
26 Snap ring
31 Insert
33 Stop
35 Depth stop
37 Latching lug
50 Horn antenna
52 Antenna horn
54 Filling
1a Radar electronics
2a Inner face of the container
3a Housing
H Main emission direction
I Process environment Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A radar measuring device with a housing, wherein the housing can be connected in a sealing manner to an accommodating portion, wherein the housing is configured at the front as a process connection and wherein a dielectric lens is disposed at the front of the housing and connected to the process connection such that the lens is fixed in the axial direction relative to the housing, wherein a positive connection is formed between the lens and the process connection, wherein: the positive connection is configured as a latching connection or as a snap-fit connection and an insert is disposed in the process connection and the insert is arranged such that it blocks a disengagement of the positive connection and wherein the insert insures that the connection between the lens and the process connection cannot be disengaged inadvertently.

2. The radar measuring device according to claim 1, wherein a web is formed on the lens side and a contact portion is formed on the process connection side.

3. The radar measuring device according to claim 1, wherein a snap ring and/or a contact portion are formed in a segmented manner in a circumferential direction.

4. The radar measuring device according to claim 1, wherein a lens-side part of the positive connection is formed from the same material as the lens.

5. The radar measuring device according to claim 1, wherein the lens is formed from at least two parts, a lens body and a connecting part, wherein the connecting part is formed as a lens-side part of the positive connection from a different material than the lens body.

6. The radar measuring device according to claim 5, wherein the lens body and the connecting part are connected to each other by means of two-component injection molding.

7. The radar measuring device according to claim 1, wherein the insert is configured as a dog for biasing the lens in relation to the process connection.

8. The radar measuring device according to claim 1, wherein the insert is integrally formed with an antenna.

9. The radar measuring device according to claim 1, wherein the insert has a peripherally extending stop, for limiting an insertion depth of the stop into the process connection.

10. The radar measuring device according to claim 1, wherein the process connection and the lens have grooves that are formed so as to correspond to each other, and the snap ring is dimensioned such that, in an installed state, it comes to rest between the process connection and the lens such that the snap ring limits an axial movement at least in a direction towards the front.

11. The radar measuring device according to claim 1, wherein the lens is rotatably supported relative to the process connection.

12. The radar measuring device according to claim 1, wherein the lens is non-rotatably supported relative to the process connection.

13. The radar measuring device according to claim 1, wherein a first seal is disposed between the lens and the process connection, wherein the lens forms an accommodating space for the first seal.

14. A measuring assembly comprised of the radar measuring device of claim 1 and an accommodating portion, wherein the radar measuring device housing is connected in a sealing manner to the accommodating portion.

15. The measuring assembly according to claim 14, wherein a second seal, which meets the requirements of hygienic processes, is arranged directly between the lens and the accommodating portion.

* * * * *